United States Patent
Eom et al.

(10) Patent No.: US 7,526,288 B2
(45) Date of Patent: Apr. 28, 2009

(54) SYSTEM AND METHOD FOR CONTROLLING OPERATION STATES OF A MEDIUM ACCESS CONTROL LAYER IN A BROADBAND WIRELESS ACCESS COMMUNICATION SYSTEM

(75) Inventors: Kwang-Seop Eom, Seongnam-si (KR);
Seung-Eun Hong, Suwon-si (KR);
Bong-Gee Song, Seongnam-si (KR);
Hong-Sung Chang, Suwon-si (KR);
Hyeong-Jong Ju, Seoul (KR); Min-Hee Cho, Anyang-si (KR)

(73) Assignee: Samsung Electronics Co., Ltd (KR)

( * ) Notice: Subject to any disclaimer, the term of this patent is extended or adjusted under 35 U.S.C. 154(b) by 782 days.

(21) Appl. No.: 11/009,229

(22) Filed: Dec. 10, 2004

(65) Prior Publication Data
US 2005/0128990 A1    Jun. 16, 2005

(30) Foreign Application Priority Data
Dec. 12, 2003    (KR)    ............ 10-2003-0090863

(51) Int. Cl.
*H04Q 7/20*    (2006.01)

(52) U.S. Cl. ............ 455/435.1; 455/433; 455/574; 455/343.1; 455/127.5

(58) Field of Classification Search .............. None
See application file for complete search history.

(56) References Cited

U.S. PATENT DOCUMENTS 6,422,561 B1 * 7/2002 Schroeder .......... 273/272
2003/0222819 A1 * 12/2003 Karr et al. .......... 342/457

* cited by examiner

*Primary Examiner*—Philip J Sobutka
(74) *Attorney, Agent, or Firm*—The Farrell Law Firm, PC

(57) ABSTRACT

An apparatus and method for controlling operation states of a medium access control layer by a mobile subscriber station (MSS) in a broadband wireless access communication system. The method includes: state-transitioning into a sleep state or an idle state when there is no data transmitted between a base station and the MSS during a predetermined first time interval in an awake state; and performing a location change in the idle state when the mobile subscriber station moves from a first paging zone to a second paging zone, and state-transiting into the awake state when the mobile subscriber station in the idle state detects a paging to the mobile subscriber station. The method minimizes power consumption and maximizes efficiency in use of radio resources.

21 Claims, 10 Drawing Sheets

SYSTEM AND METHOD FOR CONTROLLING OPERATION STATES OF A MEDIUM ACCESS CONTROL LAYER IN A BROADBAND WIRELESS ACCESS COMMUNICATION SYSTEM

PRIORITY

This application claims priority to an application entitled "System and Method for Controlling Operation States of Medium Access Control Layer in Broadband Wireless Access Communication System" filed in the Korean Industrial Property Office on Dec. 12, 2003 and assigned Serial No. 2003-90863, the contents of which are hereby incorporated by reference.

BACKGROUND OF THE INVENTION

1. Field of the Invention

The present invention relates generally to a broadband wireless access communication system, and more particularly to a system and method for controlling operation states of a medium access control layer.

2. Description of the Related Art

In a $4^{th}$ generation (4G) communication system, which is the next generation communication system, research is being performed to provide users with services having various qualities of service (QoSs) at a high transmission speed.

A wireless local area network (LAN) communication system and a wireless metropolitan area network (MAN) communication system generally support transmission speeds of 20 to 50 Mbps. Because the wireless MAN communication system has wide service coverage and supports a high transmission speed, it is suitable for supporting a high-speed communication service. However, the wireless MAN system does not in any way reflect the mobility of a user, i.e., a subscriber station (SS), nor does it reflect in any way a handover according to the high-speed movement of the SS.

Accordingly, in a current 4G communication system, a new type of communication system ensuring mobility and QoS for the wireless LAN system and the wireless MAN system supporting relatively high transmission speeds is currently being developed to support a high speed service to be provided by the 4G communication system.

An IEEE (Institute of Electrical and Electronics Engineers) 802.16a communication system is a system utilizing an Orthogonal Frequency Division Multiplexing (OFDM) scheme and an Orthogonal Frequency Division Multiple Access (OFDMA) scheme in order to support a broadband transmission network for a physical channel of the wireless MAN system.

The IEEE 802.16a communication system considers only a single cell structure and stationary SSs, which means the system does not in any way reflect mobility of the SSs at all. However, An IEEE 802.16e communication system has been defined as a system reflecting mobility of an SS in addition to the IEEE 802.16a communication system, thus should reflect mobility of an SS in a multi-cell environment.

In order to provide the mobility of an SS in a multi-cell environment as described above, it is inevitably required that change of operation states of the SS and a base station (BS) is possible. Therefore, research concerning the handover of the SS in consideration of the multi-cell structure is now actively being performed in order to support the mobility of the SS. Herein, an SS having the mobility is referred to as an MSS (mobile subscriber station).

FIG. 1 is a block diagram schematically illustrating a conventional IEEE 802.16e communication system. Referring to FIG. 1, the IEEE 802.16e communication system has a multi-cell structure, that is, a cell 100 and a cell 150. Also, the IEEE 802.16e communication system includes a BS 110 for controlling the cell 100, a BS 140 for controlling the cell 150, and a plurality of MSSs 111, 113, 130, 151, and 153. The transmission/reception of signals between the BSs 110 and 140 and the MSSs 111, 113, 130, 151, and 153 is accomplished using an OFDM/OFDMA method. The MSS 130 is located in a cell boundary area (i.e., handover area) between the cell 100 and the cell 150. Accordingly, it is possible to support the mobility for the MSS 130, only when a handover for the MSS 130 is supported.

In the IEEE 802.16e communication system, a certain MSS receives pilot channel signals transmitted from a plurality of BSs and measures Carrier to Interference and Noise Ratios (CINRs) of the received pilot channels. The MSS selects a BS transmitting a pilot channel signal having the highest CINR from among the measured CINRs as a serving BS, which is a BS to which the MSS currently belongs. That is, the MSS identifies a BS transmitting the best pilot channel signal that the MSS can receive in the best condition from among the BSs as the serving BS to which the MSS currently belongs. After selecting the serving BS, the MSS receives the downlink frame and uplink frame transmitted from the serving BS and uses them in transmitting and receiving data.

When the mobility of subscriber station is taken into consideration in the IEEE 802.16e communication system as described above, power consumption of the MSS plays an important part in the performance of the entire system. Therefore, a sleep mode or state operation and an awake mode or state operation corresponding to the sleep state operation have been proposed for the BS and the MSS in order to minimize the power consumption of the MSS.

FIG. 2 is a state diagram schematically illustrating the operation states supported by a Medium Access Control (MAC) layer of the IEEE 802.16e communication system. Referring to FIG. 2, the MAC layer of the IEEE 802.16e communication system supports two kinds of operation states, i.e., an awake state 210 and a sleep state 220. The sleep state 220 has been proposed to minimize the power consumption of the MSS during the idle interval in which the packet data is not being transmitted. That is, the MSS state-transits (211) from the awake state 210 into the sleep state 220, thereby minimizing the power consumption of the MSS during the idle interval in which the packet data is not being transmitted.

In general, the packet data is transmitted in a burst when generated. Accordingly, it is unreasonable that the same operation is performed in both an interval in which packet data is not transmitted and an interval in which packet data is transmitted. Therefore, the sleep state operation as described above has been proposed.

However, when packet data to be transmitted is generated while the MSS is in the sleep state, the MSS state-transitions to the awake state and transmits/receives the packet data. However, because the packet data is highly reliable on a traffic mode, the sleep state operation must be organically performed in consideration of the traffic characteristic and the transmission scheme characteristic of the packet data, i.e., the sleep state operation must be performed by considering the traffic characteristic and the transmission scheme characteristic of the packet data in the awake state.

In order to state-transition into the sleep state 220, an MSS must necessarily receive state transition consent from a BS. Further, the BS must enable the MSS to shift into the sleep state 220 while simultaneously buffering or dropping the packet data to be transmitted to the MSS. Also, the BS must inform the MSS of existence of packet data to be transmitted during the listening interval of the MSS. Herein, the MSS awakes from the sleep state 220 and checks if there exist packet data to be transmitted from the BS to the MSS. The listening interval will be described below in more detail.

When there is packet data to be transmitted from the BS to the MSS, the MSS state-transitions to the awake state 210 from the sleep state 220 and receives the packet data from the BS. However, when there is no packet data to be transmitted from the BS to the MSS, the MSS remains in the awake state 220.

Hereinafter, parameters required for operating in the sleep state and the awake state will be described.

1) A Sleep Interval

The sleep interval is requested by an MSS and assigned by a BS according to the request of the MSS. The sleep interval represents a time interval from a state-transition of the MSS into the sleep state 220 to a state-transition of the MSS into the awake state 210 again. That is, the sleep interval is an interval in which the MSS stays in the sleep state 220. The MSS may continue to stay in the sleep state 220 even after the sleep interval is over. In this case, the MSS updates the sleep interval by performing a sleep interval update algorithm using a preset initial sleep window value and a final sleep window value. Herein, the initial sleep window value corresponds to a minimum sleep window value and the final sleep window value corresponds to a maximum sleep window value. Further, the initial sleep window value and the final sleep window value are assigned by all BSs and expressed by the number of frames. Because the minimum window value and the maximum window will be described in detail below, a further description is omitted here.

2) A Listening Interval

The listening interval is requested by an MSS and assigned by a BS according to the request of the MSS. Further, the listening interval represents a time interval from a time point at which the MSS is awaken from the sleep state 220 to a time point at which the MSS synchronizes with the downlink signal of the BS in order to be capable of decoding downlink messages such as a traffic indication (TRF_IND) message. Herein, the traffic indication message is a message representing existence of traffic (i.e., packet data) to be transmitted to the MSS. Because the traffic indication message will be described below in more detail, a detailed description is omitted here. The MSS determines whether to stay in the awake state or to state-transition into the sleep state again according to the values of the traffic indication message.

3) A Sleep Interval Update Algorithm

When the MSS state-transitions into the sleep state 220, it determines a sleep interval while considering a preset minimum window value as a minimum sleep state interval. After the sleep interval passes, the MSS is awaken from the sleep state 220 for the listening interval and checks if there is packet data to be transmitted from the BS. I If there exist no packet data to be transmitted, the MSS renews the sleep interval to be twice as long as that of a previous sleep interval and remains in the sleep state 220. For example, when the minimum window value is "2", the MSS sets the sleep interval to be 2 frames and stays in the sleep state for 2 frames. After passage of the 2 frames, the MSS awakes from the sleep state and determines if the traffic indication message has been received.

When the traffic indication message has not been received (that is, when no packet data transmitted from the BS to the MSS exists), the MSS sets the sleep interval to be 4 frames (i.e., twice as many as 2 frames) and remains in the sleep state 220 during the 4 frames. Also, when the MSS detects an absence of data targeting the MSS from the traffic indication message, even though the MSS has received the traffic indication message, the MSS sets the sleep interval to be 4 frames (twice as many as 2 frames) and remains in the sleep state 220 during the 4 frames. The operation of detecting the absence of data targeting the MSS from the traffic indication message will be described in more detail later and is thus omitted here. The sleep interval increases within a range from the initial sleep window value to the final sleep window value.

Hereinafter, messages currently defined in the IEEE 802.16e communication system for supporting operations in the sleep state 220 and the awake state 210 as described above, will be described.

1) A Sleep Request (SLP REQ) Message

The sleep request message is transmitted from an MSS to a BS and is used when the MSS requests a state-transition to the sleep state 220. The sleep request message contains parameters, i.e., information elements (IEs), required when the MSS operates in the sleep state 220. Table 1 shows the format of the sleep request message.

TABLE 1

| Syntax | Size |
| --- | --- |
| SLP-REQ_Message_Format(| { | |
| Management Message Type = 45 | 8 bits |
| Initial-sleep window | 6 bits |
| Final-sleep window | 10 bits |
| } | |

The sleep request message is a dedicated message transmitted based on a connection ID (CID) of an MSS. The information elements of the sleep request message shown in Table 1 will be described hereinafter.

The 'Management Message Type' represents a type of a message currently being transmitted. For example, when the 'Management Message Type' has a value of 45 (Management Message Type=45), it represents the sleep request message. The 'Initial-sleep Window' value represents a start value requested for the sleep interval, and the 'Final-sleep Window' value represents a stop value requested for the sleep interval. That is, as described above for the sleep interval update algorithm, the sleep interval may be updated within a range from the initial-sleep window value to the final-sleep window value.

2) A Sleep Response (SLP RSP) Message

The sleep response message is a message in response to the sleep request message. The sleep response message may be used to represent whether to approve or deny the state-transition into the sleep state 220 requested by the MSS, or to represent the state-transition into the sleep state 220 according to an unsolicited instruction. A detailed description of when the sleep response message is used as a message for the unsolicited instruction is omitted here but will be provided in more detail below. The sleep response message contains information elements required when the MSS operates in the sleep state 220. Table 2 shows the format of the sleep response message.

TABLE 2

| Syntax | Size | Notes |
|---|---|---|
| MOB_SLP-RSP_Message_Format( ) { | | |
|   Management Message Type = 46 | 8 bits | |
|   Sleep-approved | 1 bit | 0: Sleep-mode request denied 1: Sleep-mode request approved |
|   If (Sleep-approved == 0) { | | |
|     After-REQ-action | 3 bits | 000: the MSS may retransmit the SLP-REQ message at any time 001: the MSS shall retransmit the SLP-REQ message after the time duration given by the BS in the message 010: the MSS shall not retransmit the SLP-REQ message and wait the SLP-RSP message from the BS 011:111: Reserved |
|     REQ_Duration | 4 bits | Time duration for case where After-REQ-action value is 001. |
|   } else { | | |
|     Start-frame | 7 bits | |
|     Initial-sleep window | 6 bits | |
|     Final-sleep window | 10 bits | |
|   } | | |
| } | | |

The sleep response message also is a dedicated message transmitted based on the connection ID of an MSS, and the sleep response message includes information elements as shown in Table 2, which will be described hereinafter.

The 'Management Message Type' is a type of a message currently being transmitted. For example, when the 'Management Message Type' has a value of 46 (Management Message Type=46), it represents the sleep response message. Further, the value of the 'Sleep-approved' is expressed by one bit. Therefore, when the 'Sleep-approved' has a value of 0, it implies that the request for the transition 220 into the sleep state has been denied. However, when the 'Sleep-approved' has a value of 1, the request for the transition into the sleep state has been approved.

3) A Traffic Indication (TRF_IND) Message

The traffic indication message is transmitted to an MSS during the listening interval and represents the existence or absence of packet data to be transmitted from a BS to the MSS. Table 3 shows the format of the traffic indication message.

TABLE 3

| Syntax | Size |
|---|---|
| TRF-IND_Message_Format( ) { | |
|   Management Message Type = 47 | 8 bits |
|   Num-positive | 8 bits |
|   for (i = 0: i < Num-positive: i++) { | |
|     CID | 16 bits |
|   } | |
| } | |

The traffic indication message is a broadcasting message transmitted according to the broadcasting method, differently from the sleep request message and the sleep response message. The traffic indication message represents if packet data to be received by the MSS awaken from the sleep state 220 exists during the listening interval. The MSS decodes the broadcasted traffic indication message during the listening interval and determines whether to state-transit into the awake state 210 or to continue to stay in the sleep state 220. When the MSS state-transits into the awake state 210, the MSS confirms frame sync.

When the frame sync does not coincide with a frame sequence number expected by the MSS, the MSS can request retransmission of packet data lost in the awake state 210. When the MSS fails to receive the traffic indication message during the listening interval or the traffic indication message received by the MSS does not contain a positive indication, the MSS returns to the sleep state 220. That is, the MSS awaken from the sleep state 220 receives the traffic indication message and state-transit into the awake state 210 only when the received traffic indication message includes a positive indication targeting the MSS itself (i.e., a connection ID of the MSS itself).

Hereinafter, the information elements of the traffic indication message shown in Table 3 will be described.

The 'Management Message Type' represents a type of a message currently being transmitted. For example, when the 'Management Message Type' has a value of 47 (Management Message Type=47), it represents the traffic indication message. Further, the 'Num-positive' includes the number of positive MSSs (i.e., MSSs which will receive packet data) and a connection ID of each of the positive MSSs.

FIG. 3 is a signal flowchart schematically illustrating a process in which an MSS enters a network of a conventional IEEE 802.16e communication system. Referring to FIG. 3, in step 311, after a power-on, the MSS monitors all predetermined frequency bands and detects a pilot channel signal having a largest magnitude (e.g., a pilot channel signal having the largest CINR). Then, the MSS determines the BS transmitted the pilot channel signal having the largest CINR as the serving BS to which the MSS currently belongs. The MSS receives preambles of downlink frames transmitted from the serving BS and acquires system sync with the serving BS.

Thereafter, the MSS acquires downlink sync from BS information contained in messages broadcasted by the BS, which includes a Downlink Channel Descriptor (DCD) message, an Uplink Channel Descriptor (UCD) message, a downlink map (DL-MAP) message, an uplink map (UL-MAP) message, and a mobile neighbor advertisement (MOB-NBR-ADV) message.

In step 313, the MSS transmits a ranging request (RNG-REQ) to the BS, receives a ranging response (RNG-RSP) from the BS in response to the RNG-REQ, and acquires uplink sync with the BS from the RNG-RSP. In step 315, the MSS adjusts frequency and power.

In step 317, the MSS negotiates with the BS about a basic capacity of the MSS. In step 319, the MSS acquires a Traffic Encryption Key (TEK) by performing authentication operation together with the BS. In step 321, the MSS requests the BS to register the MSS and the BS completes registration of the MSS.

In step 323, the MSS performs Internet Protocol (IP) connection with the BS. In step 325, the MSS downloads operational information through the IP in connection with the BS. In step 327, the MSS performs service flow connection with the BS. Here, the service flow refers to a flow in which MAC-SDUs (service data units) are transmitted and received through a connection having a certain QoS. Thereafter, in step 329, the MSS uses the service provided from the BS, and the process ends.

To support a handover in the IEEE 802.16e communication system, the MSS must measure CINRs of pilot channel signals transmitted from neighbor BSs and the BS (i.e., the serving BS) to which the MSS currently belongs. Hereinafter, a process in which the MSS measures CINRs of pilot channel signals transmitted from the serving BS and the neighbor BSs in the IEEE 802.16e communication system will be described with reference to FIG. 4. Herein, for convenience of description, the phrase 'measure the CINR of the pilot channel signal' may be expressed by 'scan or perform a scanning for the CINR of the pilot channel signal'.

FIG. 4 is a signal flow diagram schematically illustrating a process of scanning CINRs of pilot channel signals transmitted from a serving BS and neighbor BSs in a conventional IEEE 802.16e communication system. Referring to FIG. 4, the serving BS 410 transmits a MOB-NBR-ADV message to the MSS 400 in step 411. Additionally, the flow diagram in FIG. 4 is based on an assumption that there are two neighboring BSs (N_Neighbors=2).

The MSS 400 can acquire information on the neighbor BSs from the received MOB-NBR-ADV message. When the MSS wants to scan CINRs of pilot channel signals transmitted from the neighboring BSs, the MSS transmits a Mobile Scanning Interval Allocation Request (MOB-SCN-REQ) message to the serving BS 410 in step 413. Here, interval information of the scanning interval to be scanned by the MSS 400 is included in the MOB-SCN-REQ message by the MSS 400, and in FIG. 4 it is assumed that the scanning interval corresponds to N frames (DURATION=N FRAMES).

The time point at which the MSS 400 transmits the scanning request has no direct relation to the CINR scanning of the pilot channel signal, so detailed description thereof is omitted here.

The serving BS having received the MOB-SCN-REQ message transmits a Mobile Scanning Interval Allocation Response (MOB-SCN-RSP) message to the MSS 400 in step 415. Here, the MOB-SCN-RSP message includes information on a time point at which the MSS 400 starts the scanning and information on duration of the scanning interval. In FIG. 4, it is assumed that the time point at which the MSS 400 starts the scanning is a time point when M frames have passed after the MOB-SCN-RSP message was received (START IN M FRAMES, DURATION=N FRAMES).

After receiving the MOB-SCN-RSP message containing the scanning information, the MSS 400 waits for scanning of CINRs of the pilot channel signals during the M frames in step 417. Then, the MSS scans CINRs of the pilot channel signals during the scanning interval included in the MOB-NBR-ADV message (i.e., during N frames) for the neighboring BSs acquired through reception of the MOB-NBR-ADV message in step 419.

FIG. 5 is a signal flow diagram schematically illustrating a handover process in a conventional IEEE 802.16e communication system. Referring to FIG. 5, the MSS scans CINRs of the pilot channel signals from the neighboring BSs in the process described with reference to FIG. 4 in step 511. When the MSS 500 determines that it is necessary to change the serving BS to which the MSS belongs, that is, when the MSS 500 determines that it is necessary to replace the current serving BS by a new serving BS different from the current serving BS in step 513, the MSS 500 transmits an MSS Handover Request (MOB-MSSHO-REQ) message to the current serving BS 510 in step 515.

In FIG. 5, it is assumed that the MSS 500 has three neighboring BSs including a first BS 520, a second BS 530, and a third BS 540. Here, the MOB-MSSHO-REQ message includes the scanned result of the CINRs of the pilot channel signals.

After receiving the MOB-MSSHO-REQ message transmitted from the MSS 500, the serving BS 510 detects information on a list of neighboring BSs to which the MSS 500 can be handed over from information contained in the received MOB_MSSHO_REQ message in step 517. Here, for the convenience of description, the list of neighboring BSs to which the MSS 500 can be handed over will be referred to as 'handover-available neighboring BS list'. FIG. 5 is based on an assumption that the handover-available neighboring BS list includes the first BS 520 and the second BS 530. The serving BS 510 transmits a handover notification (HO-notification) message to the neighbor BSs included in the handover-available neighboring BS list, i.e., the first BS 520 and the second BS 530 in steps 519 and 521. Upon receiving the HO-notification message from the serving BS 510, each of the first BS 520 and the second BS 530 transmits a handover notification response (HO-notification-response) message, which is a response message to the HO-notification message, to the serving BS 510 in step 523 and 525. The HO-notification-response message includes a plurality of Information Elements (IEs) including an MSS ID of the MSS 500 intending to handover to a corresponding neighboring BS, a response (ACKnowledgement(ACK)/Negative ACKnowledgment (NACK) indicating if the neighboring BSs can perform the handover in response to the request of the MSS 500, and bandwidth and service level information which each of the neighboring BSs can provide when the MSS 500 is handed over to each of the neighboring BSs.

When the serving BS 510 has received the HO-notification-response messages transmitted from the first neighboring BS 520 and the second neighboring BS 530, the serving BS 510 selects a neighboring BS, which can optimally provide a bandwidth and a service level requested by the MSS 500 when the MSS 500 is handed over, as a target BS to which the MSS 500 will be actually handed over. For example, if the service level required by the MSS 500 is higher than a service level that can be provided by the first neighboring BS 520 and is equal to a service level that can be provided by the second neighboring BS 530, the serving BS 510 will select the second neighboring BS 530 as the target BS to which the MSS 500 will be actually handed over to. The serving BS 510 transmits a handover notification confirmation (HO-notification-confirm) message to the second neighboring BS 530 as a response to the HO-notification-response message in step 527.

The serving BS 510 transmits an MSS handover response (MOB-HO-RSP) message to the MSS 500 as a response to the MOB-MSSHO-REQ message in step 529. The MOB-HO-RSP message contains information on the target BS to which the MSS 500 will be handed over.

Upon receiving the MOB-HO-RSP message, the MSS 500 analyzes the information contained in the MOB-HO-RSP message and selects the target BS to which the MSS 500 will be handed over. After selecting the target BS, the MSS 500 transmits an MSS handover indication (MOB-HO-IND) message to the serving BS 510 as a response to the MOB-HO-RSP message in step 531.

Upon receiving the MOB-HO-IND message, the serving BS 510 recognizes that the MSS 500 will be handed over to the target BS (i.e., the second neighboring BS 530) included in the MOB-HO-IND message, and then releases the present setup link with the MSS 500 in step 533. The MSS 500 performs an initial ranging process with the second neighboring BS 530 in step 535 and performs a network entry process with the second neighboring BS 530 when succeeded in the initial ranging in step 537.

The handover-related operations as described above with reference to FIGS. 4 and 5 are operations performed by the MSS in the awake state. However, when the MSS in the sleep state detects that the MSS itself has reached a cell boundary zone, the MSS state-transitions from the sleep state to the awake state and performs the handover-related operations as described with reference to FIGS. 4 and 5. That is, when the MSS moves from a first cell to a second cell in the sleep state, the MSS cannot restore the connection with a first BS controlling the first cell and performs a network entry process with a second BS controlling the second cell. In performing the network entry process in the current IEEE 802.16e communication system, the MSS transmits an identifier (BS ID) of the previous BS to which the MSS has previously belonged, in order for the new BS to recognize that the MSS is being handed over. Then, the new BS can acquire information of the MSS from the previous BS and perform the handover together with the MSS.

The above description is given on both a method for reducing power consumption of an MSS and a method for handover of an MSS. However, when the method for handover of an MSS is applied to an MSS in the sleep state, an efficiency of the method for reducing power consumption is degraded because the MSS, although it is in sleep state, must perform the handover as described above whenever it shifts between cells. More specifically, because even an MSS having no traffic to transmit or receive must perform the handover whenever it shifts between cells, the effect of reduction of power consumption of the MSS is degraded and message overhead is generated during the handover operation.

Additionally, all MSSs in the sleep state and the awake state perform periodic ranging. However, the periodic ranging of the MSSs in the sleep state cause unnecessary power consumption and generates message overhead.

Further, the current IEEE 802.16e communication system constantly assigns various types of basic radio resources, even to MSSs having no traffic to transmit or receive. Hereinafter, the constantly assigned basic radio resources will be described.

(1) Basic Connection Identifier (basic CID)

The basic connection identifier is used in transmitting a message that is relatively short and must be urgently transmitted (i.e., an urgent control message).

(2) Primary Management CID

The primary management CID is used in transmitting a message that is relatively long and has a relatively lower urgency.

(3) Secondary Management CID

The secondary management CID is used in transmitting a message that has a relatively lower urgency and relates to a standard protocol.

Further, in the IEEE 802.16e communication system, each MSS is assigned an Internet Protocol version 4 (IPv4) address, which is also a limited radio resource. As described above, in the IEEE 802.16e communication system, radio resources as described above, such as the connection identifiers and IPv4 are assigned to even MSSs actually having no transmitted or received traffic. Therefore, there is a necessity for a specific operation scheme of a MAC layer for supporting operations between a BS and an MSS, which can maximize efficiency in using radio resources, while minimizing power consumption of the MSS moving at a high speed.

SUMMARY OF THE INVENTION

Accordingly, the present invention has been designed to solve the above and other problems occurring in the prior art.

An object of the present invention is to provide a system and a method for controlling MAC layer operation states of a broadband wireless access communication system.

It is another object of the present invention to provide a system and a method for minimizing power consumption of MSSs by controlling MAC layer operation states of a broadband wireless access communication system.

In order to accomplish the above and other objects, there is provided a system for controlling operation states of a medium access control layer by a mobile subscriber station in a broadband wireless access communication system having an awake state in which there is data to be transmitted between the mobile subscriber station and a base station and an idle state in which there is no data to be transmitted between the mobile subscriber station and the base station. The system includes: a mobile subscriber station for requesting de-registration of the mobile subscriber station to the base station when there is no data transmission between the base station and the mobile subscriber station during a predetermined first time interval in the awake state, state-transiting from the awake state to the idle state when receiving a response to the de-registration request, requesting location change to a paging zone controller when the mobile subscriber station in the idle state moves from a first paging zone, to which the mobile subscriber station currently belongs, to a second paging zone different from the first paging zone, receiving a location change response to the location change request, and state-transiting from the idle state to the awake state when detecting existence of a paging to the mobile subscriber station; a base station for canceling registration of the mobile subscriber station and transmitting a response to the de-registration request to the mobile subscriber station, when the base station has received de-registration request from the mobile subscriber station; and a paging zone controller for changing a location of the mobile subscriber station into a location within the second paging zone in accordance with the location change request and transmitting a response to the location change request to the mobile subscriber station.

In accordance with another aspect of the present invention, there is provided a method for controlling operation states of a medium access control layer by a mobile subscriber station in a broadband wireless access communication system having an awake state in which there is data to be transmitted between the mobile subscriber station and a base station and an idle state in which there is no data to be transmitted between the mobile subscriber station and the base station. The method includes the steps of: state-transitioning into the sleep state or an idle state when there is no data transmission to or from the base station during a predetermined first time interval in the awake state; changing location in the idle state when the mobile subscriber station moves from a first paging zone, to which the mobile subscriber station currently belongs, to a second paging zone different from the first paging zone; and state-transiting into the awake state, when the mobile subscriber station in the idle state detects existence of a paging to the mobile subscriber station.

In accordance with another aspect of the present invention, there is provided a method for controlling operation states of a medium access control layer by a mobile subscriber station in a broadband wireless access communication system having an awake state in which there is data to be transmitted between the mobile subscriber station and a base station and an idle state in which there is no data to be transmitted between the mobile subscriber station and the base station. The method includes the steps of: requesting de-registration of the mobile subscriber station to the base station by the mobile subscriber station when there is no data transmission between the base station and the mobile subscriber station during a predetermined first time interval in the awake state; canceling registration of the mobile subscriber station in accordance with the de-registration request and transmitting a response to the de-registration request to the mobile subscriber station by the base station; and state-transiting from the awake state to the idle state by the mobile subscriber station in accordance with the response to the de-registration request.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Preferred embodiments of the present invention will be described in detail herein below with reference to the accompanying drawings. In the following description, a detailed description of known functions and configurations incorporated herein will be omitted when it may obscure the subject matter of the present invention.

In the following description of the present invention, an Institute of Electrical and Electronics Engineers (IEEE) 802.16e communication system performs communication using an Orthogonal Frequency Division Multiplexing (OFDM) scheme. Further, an Orthogonal Frequency Division Multiple Access (OFDMA) scheme is utilized as an example of a broadband wireless access communication system of the present invention.

Figure 1:
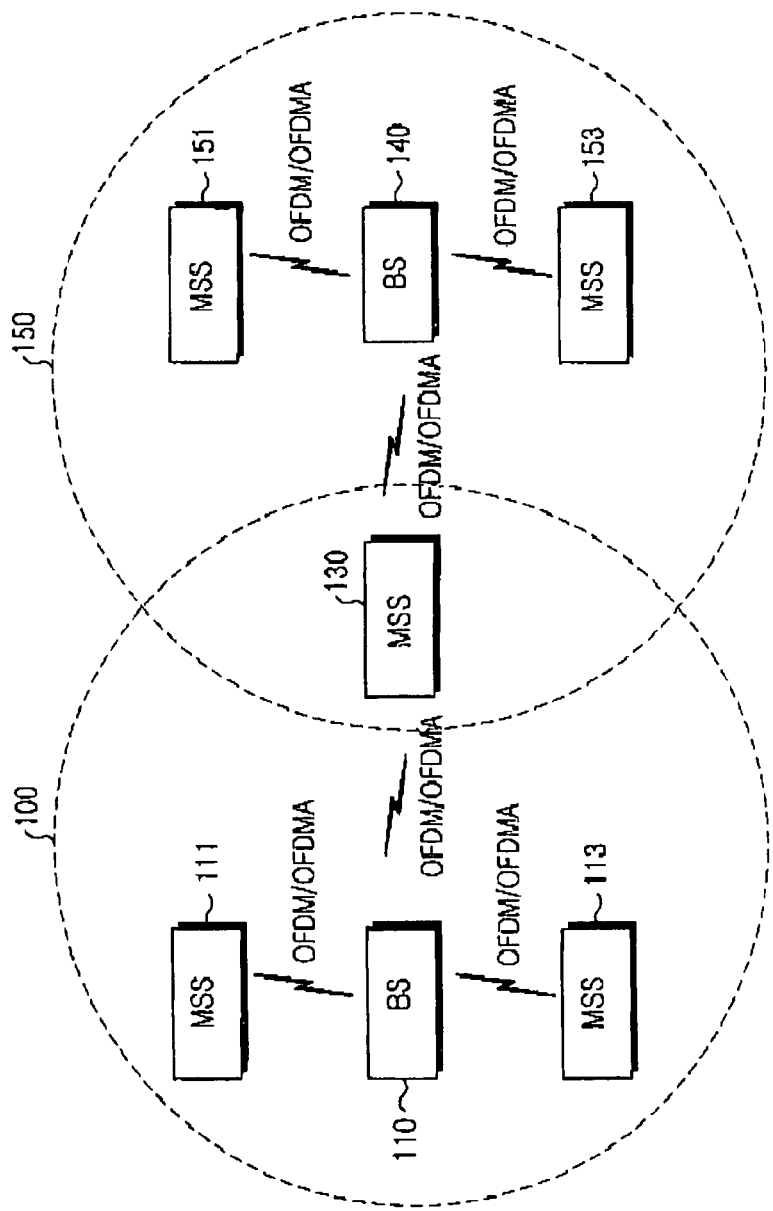
FIG. 1 is a block diagram schematically illustrating a conventional IEEE 802.16e communication system.
Figure 2:
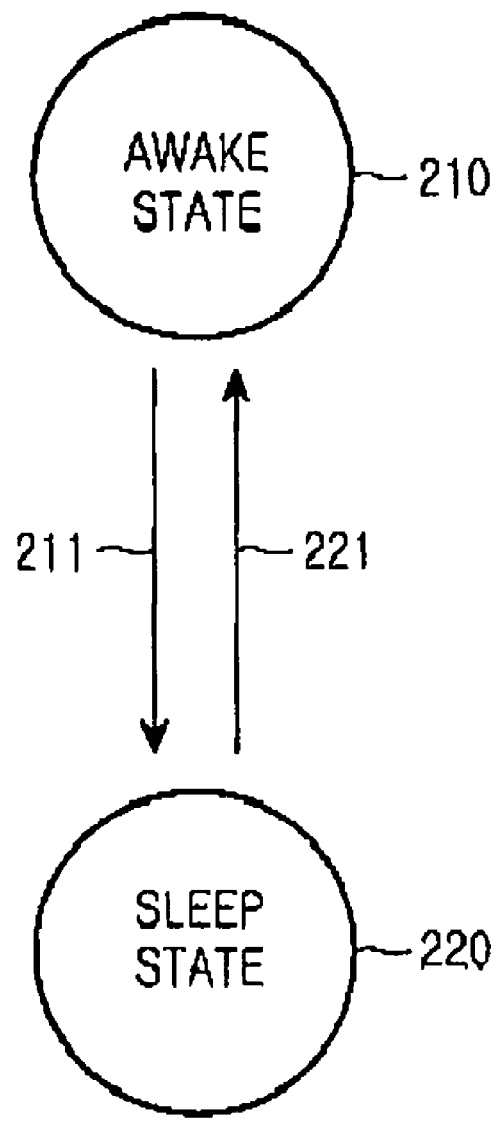
FIG. 2 is a state diagram schematically illustrating operation states supported by a MAC layer of the IEEE 802.16e communication system.
Figure 3:
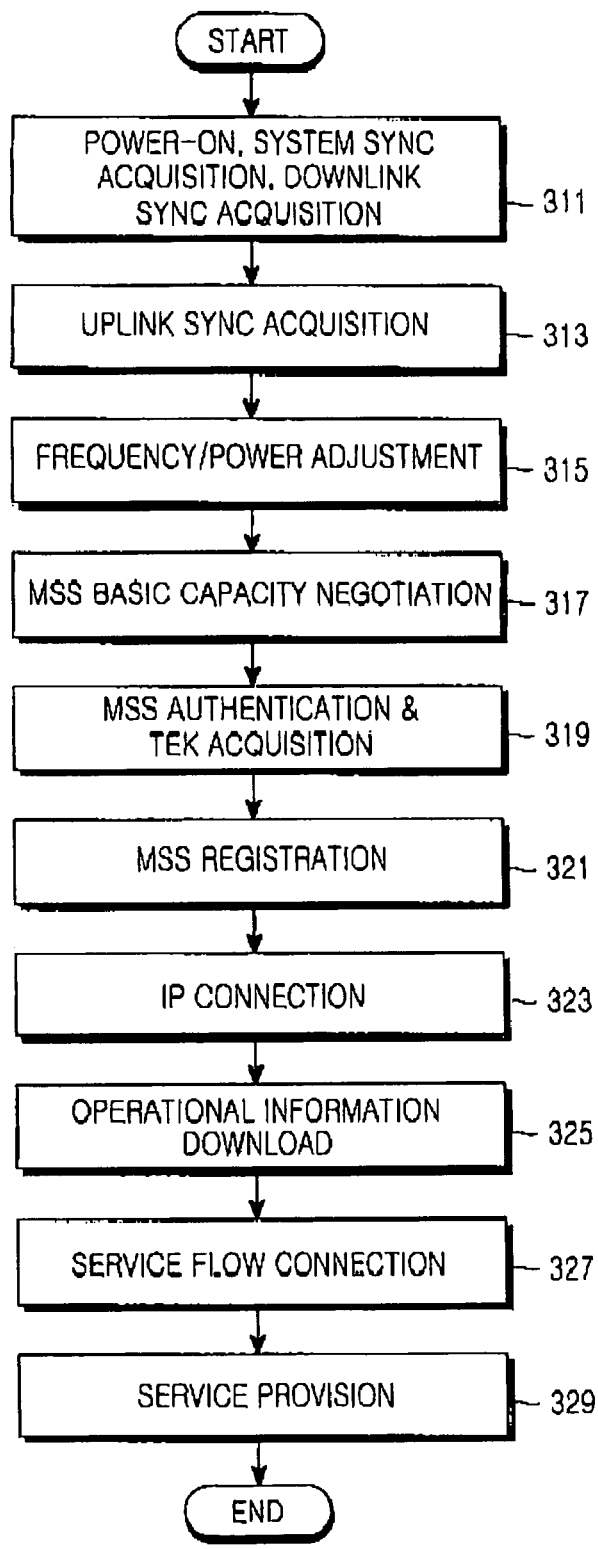
FIG. 3 is a signal flowchart schematically illustrating a process in which an MSS enters a network of a conventional IEEE 802.16e communication system.
Figure 4:
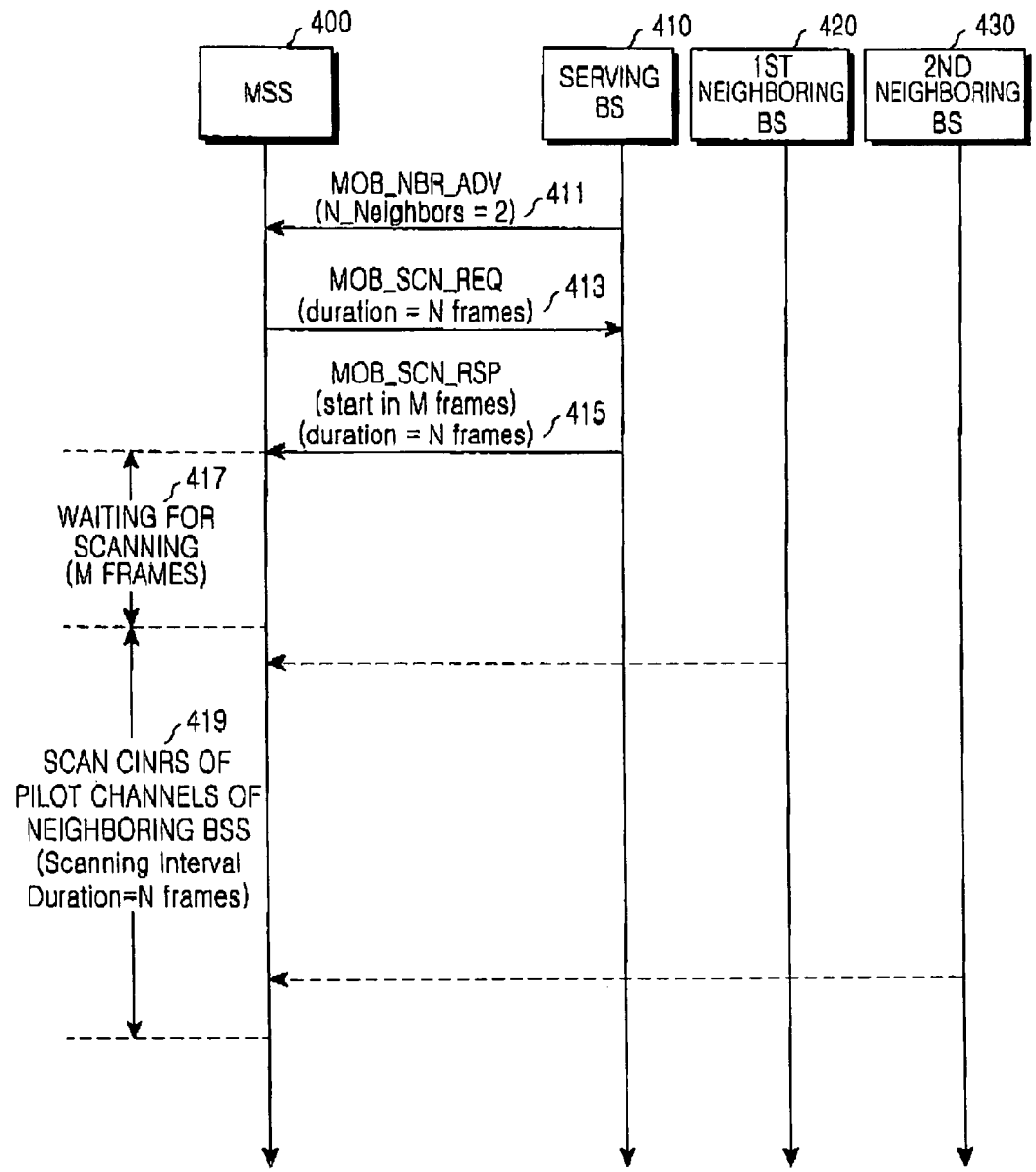
FIG. 4 is a signal flow diagram schematically illustrating a process of scanning CINRs of pilot channel signals transmitted from a serving BS and neighbor BSs in a conventional IEEE 802.16e communication system.
Figure 5:
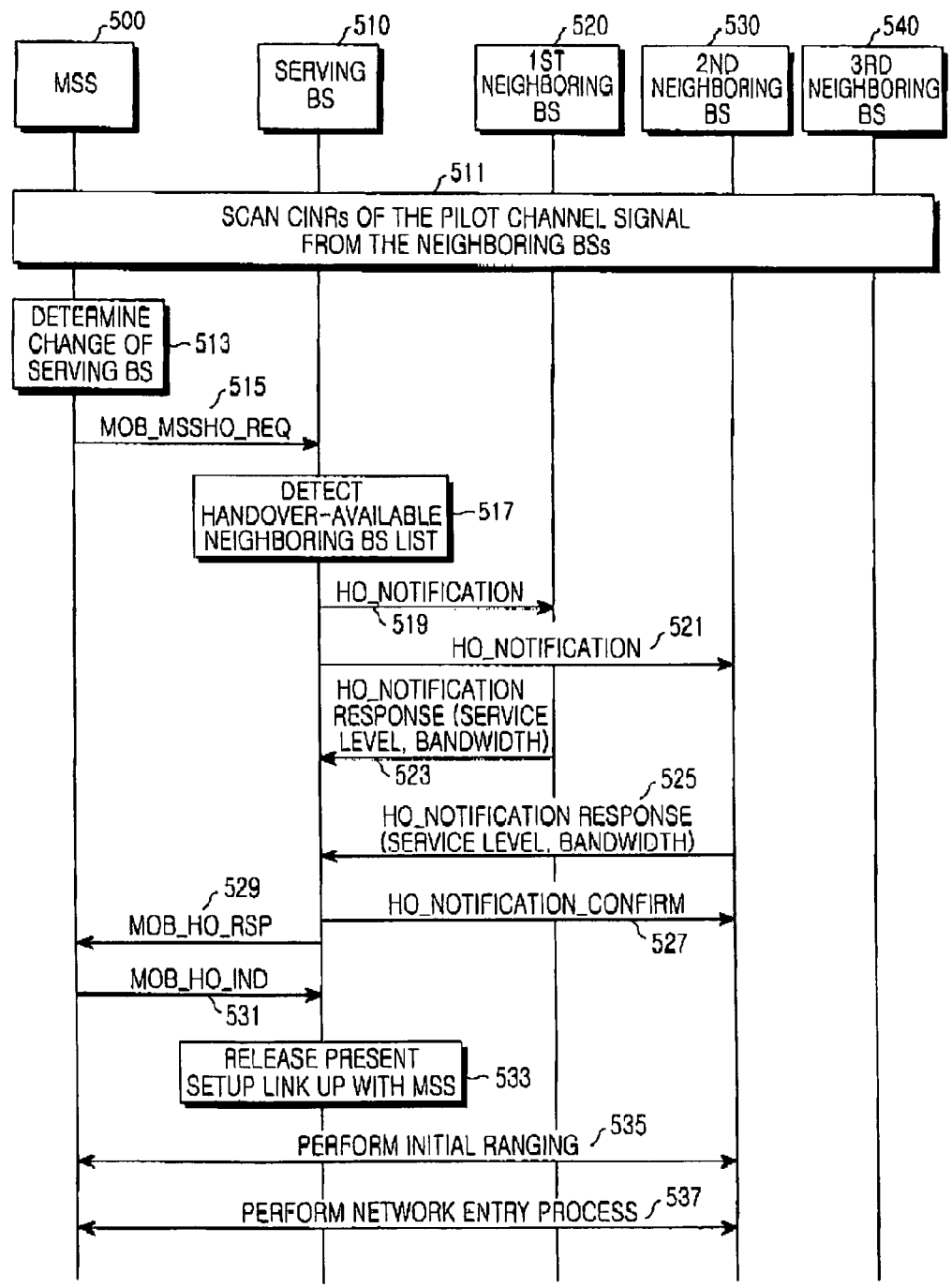
FIG. 5 is a signal flow diagram schematically illustrating a handover process in a conventional IEEE 802.16e communication system.
Figure 6:
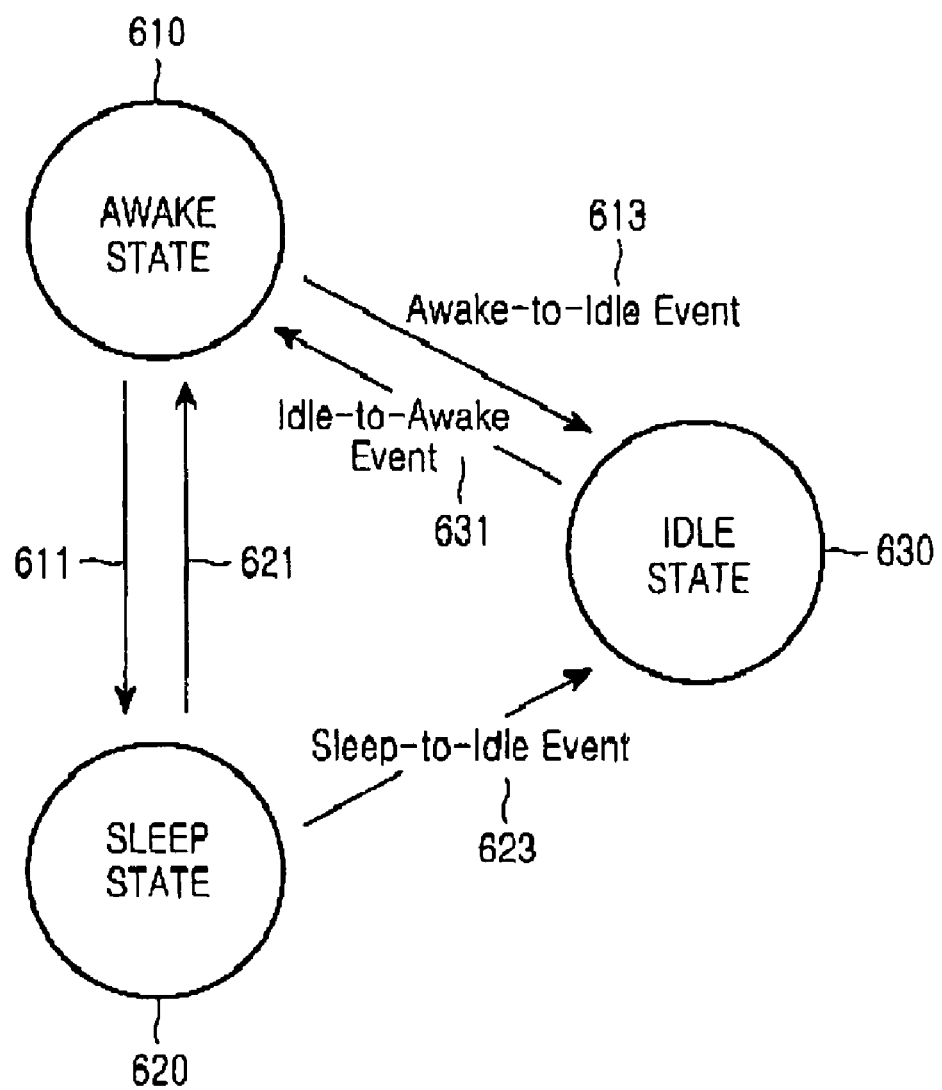
FIG. 6 is a state diagram schematically illustrating operation states supported by a MAC layer of a broadband wireless access communication system according to an embodiment of the present invention.

FIG. 6 is a state diagram schematically illustrating operation states supported by a Medium Access Control(MAC) layer of a broadband wireless access communication system according to an embodiment of the present invention. Referring to FIG. 6, a MAC layer of the IEEE 802.16e communication system supports three kinds of operation states, i.e., an awake state 610, a sleep state 620, and an idle state 630. The awake state 610 and the sleep state 620 are the same as the awake state 210 and the sleep state 220. Therefore, a detailed description of them will be omitted here.

However, the idle state 630 is a new state proposed by the present invention. An mobile subscriber station (MSS) in the idle state 630 does not transmit or receive traffic, measures downlink preambles, specifically intensities, e.g., Carrier to Interference and Noise Ratios (CINRs) of pilot channel signals, transmitted from neighboring BSs, and receives only system information and paging messages broadcasted from the neighboring BSs, thereby maximizing the effect of reduction in power consumption. In this case, when a CINR of a pilot channel signal transmitted from a serving base station (BS) to which the MSS in the idle state 630 currently belongs is lower than a CINR of a pilot channel signal transmitted from a particular neighboring BS (i.e., a target BS) from among the neighboring BSs, the MSS in the idle state 630 determines that the MSS has moved from the serving BS to the target BS. The MSS in the idle state 630 analyzes System Information (SI) broadcasted from the target BS and compares an information value identifying a paging zone, i.e., a Paging Zone Identifier (PZID), with a PZID of the previous BS or the serving BS.

As a result of the comparison, when the PZID of the previous BS is different from the PZID of the target BS, the MSS performs location registration. However, when the PZID of the previous BS is identical to the PZID of the target BS, the MSS stays in the sleep state during a predetermined time interval once more. The PZID, the paging operation, the location registration operation, and the sleep operation will be described later in more detail.

Further, the MSS in the idle state 630 is never assigned the basic resources that should be constantly assigned in the IEEE 802.16e communication system, such as a basic connection ID(CID), a primary management CID, and a secondary management CID, thereby maximizing the efficiency in use of the radio resources.

First, a process of the MSS transitioning from the awake state 610 to the idle state 630 will be described below.

The state transition of the MSS from the awake state 610 to the idle state 630 as illustrated by arrow 613 corresponds to a state transition of the MSS forced by the BS or a state transition according to a request of the MSS. Hereinafter, a state transition from the awake state 610 to the idle state 630 according to a request of the BS or according to a request of the MSS will be referred to as an "Awake-to-Idle Event". The MSS in the awake state 610 transmits a De-Registration-Request (DREG-REQ) message, which is a message requiring state transition into the idle state 630, to the BS. The DREG-REQ message includes parameters or IEs necessary for the MSS to transition into the idle state 630 and has a format as shown in Table 4.

TABLE 4

| Syntax | Size | Notes |
|---|---|---|
| DREG-REQ_Message_Format( ) { | | |
| Management Message Type | 8 bits | |

TABLE 4-continued

| Syntax | Size | Notes |
|---|---|---|
| IDLE WINDOW | 8 bits | Length in frames of sleeping interval in IDLE state |
| } | | |

In Table 4, the 'Management message Type' represents the type of the message being currently transmitted. The 'IDLE WINDOW' indicates a time interval, which is requested by the MSS and can be assigned by the BS according to the request of the MSS. The MSS periodically awakes and determines if there is a paging message as defined below for paging the MSS at an interval of the 'IDLE WINDOW'. When there is a paging message, the MSS state-transitions from the idle state 630 to the awake state 610. Further, the DREG-REQ message may be newly generated or generated by modifying an existing message used in the IEEE 802.16e communication system.

Upon receiving the DREG-REQ message from the MSS, the BS transmits a De-Registration command (DREG-CMD) message, which is a message in response to the DREG-REQ message from MSS. The DREG-CMD message includes IEs necessary for the MSS to transition into the idle state 630, and has a format as shown in Table 5.

TABLE 5

| Syntax | Size | Notes |
|---|---|---|
| DREG-CMD_Message_Format( ) {<br>Management Message Type | 8 bits | 총길이01(Bytes) |
| Idle-approved | 1 bit | 0: Idle state request denied<br>1: Idle state request approved |
| If(Dormant-approved == 0) {<br>After-REQ-action | 3 bits | 000: the MSS may retransmit the DREG-REQ at any time<br>001: The MSS shall retransmit the DREG-REQ after the time duration given by the BS<br>010: The MSS shall not retransmit the DREG-REQ and wait the DREG-CMD from the BS<br>011:111: Reserved |
| REQ-duration | 4 bits | Time duration for cast where After-REQ-action value is 001 |
| } else {<br>Start Frame | 7 bits | lower 7 bits of the frame number in which the SS shall enter into Idle state |
| Idle Window | 8 bits | Length in frames of sleeping interval in Idle state |
| } | | |

In Table 5, the 'Management message Type' represents the type of the message being currently transmitted. The 'Idle-approved' represents whether or not to allow the station transition of the MSS into the idle state 630, such that the MSS can understand if the station transition of the MSS from the awake state 610 to the idle state 630 is allowed.

Further, 'After-REQ-action' indicates information on an operation after the station transition of the MSS to the idle state 630 is denied. The 'Start Frame' indicates that the state transition of the MSS must be performed at a time point after the duration of the "Start Frame" from the time point when the MSS receives the DREG-CMD message. The DREG-CMD message is a message transmitted using a basic CID. Herein, the DREG-CMD message may be newly generated or generated by modifying an existing message used in the IEEE 802.16e communication system.

The state transition of the MSS from the idle state 630 to the awake state 610 as illustrated by arrow 631 corresponds to a state transition performed when the MSS has a data to be transmitted to the BS or when the BS pages the MSS. Herein, an event of state transition from the idle state 630 to the awake state 610 according to a request of the BS or according to a request of the MSS will be referred to as an "Idle-to-Awake Event". The MSS in the idle state 630 must perform a network entry operation in order to transit into the awake state 610. A case where the BS pages the MSS to cause the MSS to state-transit from the idle state 630 to the awake state 610 will be described later in more detail. Therefore, a detailed description thereof will be omitted here.

The state transition of the MSS from the sleep state 620 to the idle state 630 as illustrated by arrow 623 corresponds to a state transition performed when the MSS in the sleep state 620 has no transmitted or received traffic during a predetermined time interval $T_{idle}$ or a state transition forced by the BS. Herein, the BS may transmit the DREG-CMD message to cause the MSS to state-transition from the sleep state 620 to the idle state 630. Hereinafter, an event of state transition from the sleep state 620 to the idle state 630 according to a request of the BS or according to a request of the MSS will be referred to as an "Sleep-to-Idle Event".

Figure 7:
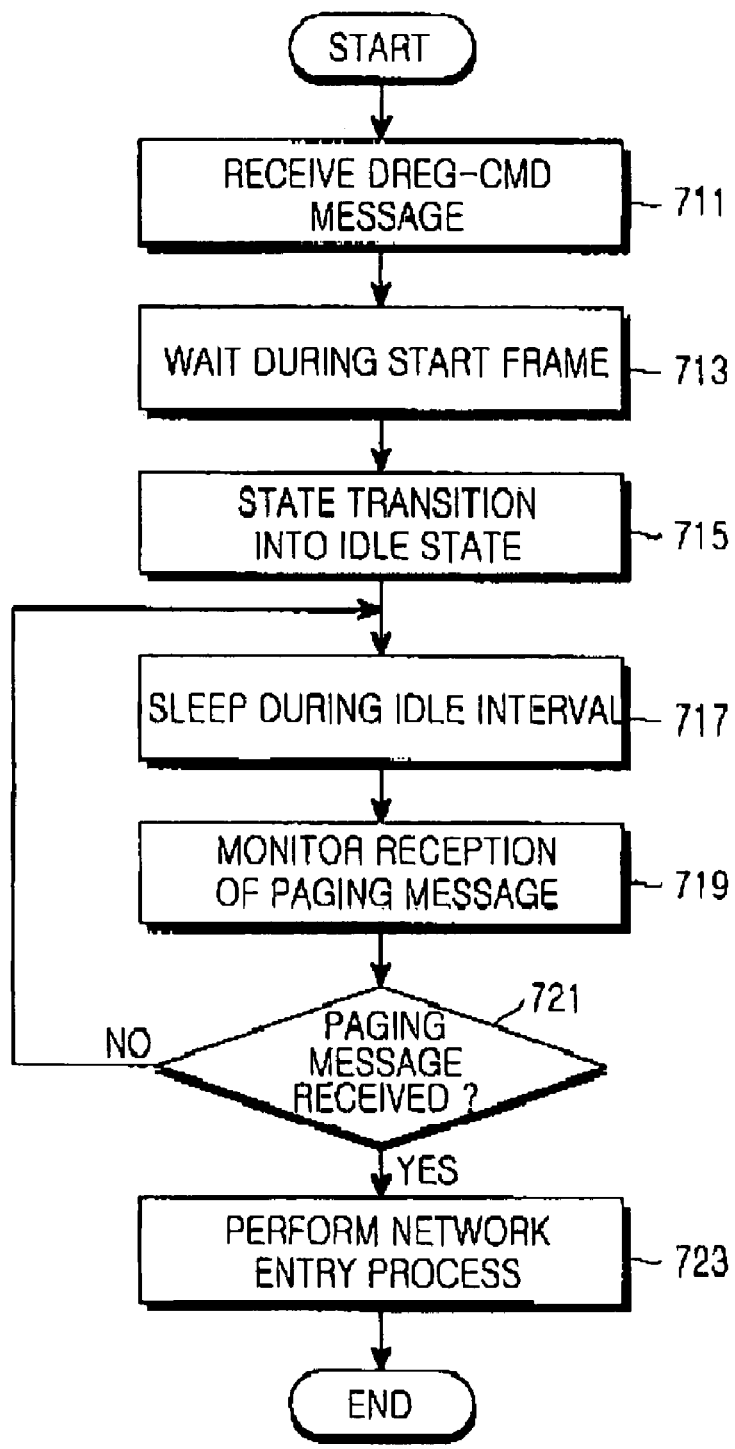
FIG. 7 is a flowchart illustrating process of an operation of the MSS in the idle state 630 illustrated in FIG. 6.

FIG. 7 is a flowchart illustrating an operation of the MSS in the idle state 630 illustrated in FIG. 6. Referring to FIG. 6, in step 711, the MSS in the awake state 610 or in the sleep state 620 receives the DREG-CMD message from the BS. In step 713, the MSS waits during the 'Start Frame' contained in the DREG-CMD message from the time point when it receives the DREG-CMD message. In step 715, the MSS state-transitions into the idle state 630 from the awake state 610 or the sleep state 620.

In step 717, the MSS sleeps during the idle interval contained in the DREG-CMD message. In step 719, the MSS awakes from the idle state 630 and monitors reception of a paging message. In step 721, the MSS determines if a paging message has been received. The paging message will be described in more detail later.

When the paging message has not been received yet, the MSS returns to step 717. When the paging message has been received, the MSS proceeds to step 723. In step 723, the MSS state-transitions into the awake state 610 according to the reception of the paging message and performs a network entry operation, and then the process is ended.

The paging message is a broadcasting message including a list of MAC addresses of MSSs staying in the idle state 630, each of which has a paging from the network. Here, in order to page the MSSs in the idle state 630 while minimizing use of the radio resources, the embodiments of the present invention use the MAC addresses assigned in the IEEE 802.16e communication system. However, page the MSSs staying in the idle state 630 does not go beyond the scope of the present invention.

Table 6 shows the format of the paging message.

TABLE 6

| Syntax | Size |
|---|---|
| Paging-Message Format ( ) { | |
|    Management Message Type | 8 bits |
|    Number of Paged Terminals | |
|    for (i=0;i<NumberofPagedTerminals;i++) { | |
|       MAC Address or new numbering-value | ? |
|    } | |
| } | |

In Table 6, the 'Management message Type' represents the type of the message being currently transmitted. The 'Number of Paged Terminals' represents the number of MSSs paged by the network from among the MSSs staying in the idle state 630 and 'MAC Address' represents a specific address (specific identifier) of each of the paged MSSs. Herein, the paging message may be newly generated or generated by modifying an existing message used in the IEEE 802.16e communication system.

When an MSS in the idle state 630 moves from a cell controlled by the serving BS (to which the MSS currently belongs) to a cell controlled by a neighboring BS different from the serving BS, the MSS can recognize its movement between the cells by measuring CINRs of pilot channel signals transmitted from the serving BS and the neighboring BS. In order to achieve exact paging while supporting the inter-cell movement of an MSS as described above, the network must exactly recognize the location of the MSS. Therefore, the MSS must register its location on the network whenever it moves between cells, thereby enabling the network to perform the exact paging of the MSS.

However, as described above, frequent registration (i.e., network entry process) of locations according to the inter-cell movement of the MSS increases power consumption of the MSS and generates message overhead due to the network entry process. Therefore, the present invention newly defines a paging zone in order to minimize the power consumption of the MSS, minimize the message overhead due to the network entry process, and maximize the efficiency of the radio resources.

The paging zone is a zone in which a plurality of BSs are grouped to constitute one paging unit. That is, a plurality of BSs are grouped to generate one paging zone as a paging unit, and location information of MSSs is managed for each of the paging zones. Each of the paging zones is identified using a PZID. Each BS broadcasts a PZID of the BS together with other system information each frame. If the MSS leaves the current paging zone and enters a new paging zone, the MSS receives a new PZID from a corresponding BS of the new paging zone. The difference between the new PZID and the previously received PZID enables the MSS to recognize an entry into the new paging zone from the previous paging zone. Here, PZID value may be contained in the DL-MAP message, etc.

After changing the paging zone as described above, the MSS requests change of location from the corresponding BS of the new paging zone, so that it can respond to a paging from a network after the change of location. In the embodiments of the present invention, a plurality of cells are grouped to be the paging zone. However, it does not go beyond the scope of the present invention to include a single cell in the paging zone. Also, the paging zone including a single cell may be applied to the inter-cell handover operation.

When the concept of the paging zone is the same as that of the single cell as described above, the concept of the paging zone can be applied to the handover between cells in the same manner. Also, when the concept of the paging zone is the same as that of the single cell, the MSS can recognize a movement from a previous cell to a new cell by means of a BS ID contained in the DL-MAP message.

Figure 8:
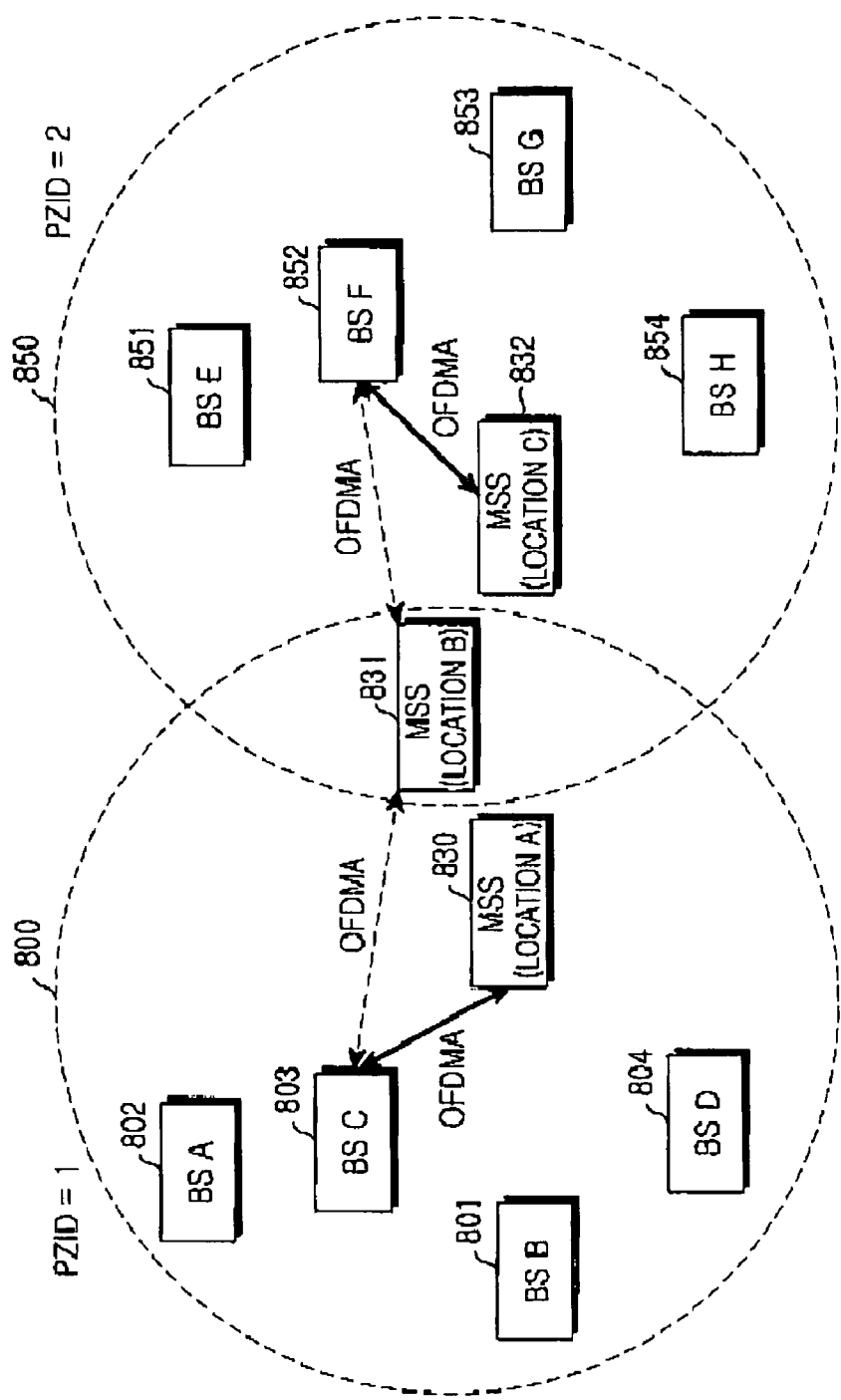
FIG. 8 is a block diagram schematically illustrating a handover process of an IEEE 802.16e communication system according to an embodiment of the present invention.

FIG. 8 is a block diagram schematically illustrating a handover process of an IEEE 802.16e communication system according to an embodiment of the present invention. In FIG. 8, an MSS (location A) 830, which is in the awake state, accesses a BS C 803, and receives a service from BS C 803. Here, it should be noted that the MSS (location A) 830, an MSS (location B) 831, and an MSS (location C) 832 (the latter two will be described later again) are in fact the same single MSS and are only different expressions according to locations of the single MSS. That is, the MSS (location A) 830 represents the MSS located at the position A, the MSS (location B) 831 represents the MSS located at the position B, and the MSS (location C) 832 represents the MSS located at the position C.

Referring to FIG. 8, when the service provided to the MSS (location A) 830 through the BS C 803 is completed, the MSS (location A) 830 has no more data to transmit to or receive from the BS C 803. Then, the MSS (location A) 830 transmits an SLP-REQ message to the BS C 803 and the BS C 803 transmits an SLP-RSP message to the MSS (location A) 830 in response to the SLP-REQ message.

Upon receiving the SLP-RSP message, the MSS (location A) 830 state-transits from the awake state to the sleep state. Of course, without the request of the MSS (location A) 830, the state transition can be forcedly performed by an SLP-REQ message transmitted from the BS C 803 to the MSS (location A) 830.

The MSS (location A) 830 is awaken from the sleep state and receives a TRF-IND message during the listening interval, thereby periodically checking if data targeting the MSS (location A) 830 is received. Here, when the MSS (location A) 830 is in the sleep state, the MSS (location A) 830 has been assigned a CID, an IP address, etc.

When the MSS (location A) 830 has no data to transmit or receive during a predetermined time interval $T_{idle}$ in the sleep state, the MSS (location A) 830 transmits DREG-REQ message to the BS C 803 and the BS C 803 transmits DREG-CMD message to the MSS (location A) 830 in response to the DREG-REQ message from the MSS. Upon receiving the DREG-CMD message, the MSS (location A) 830 state-transits from the sleep state to the idle state. Of course, without the request from the MSS (location A) 830, the BS C 803 may transmit the DREG-CMD message to the MSS (location A) 830, thereby causing forced state transition.

In order to state-transition from the awake state directly to the idle state without undergoing the sleep state, the MSS (location A) 830 may transmit the DREG-REQ message to the BS C 803 and can state-transition into the idle state when it has received the DREG-CMD from the BS C 803. Of course, without the request from the MSS (location A) 830, the BS C 803 may transmit the DREG-CMD message to the MSS (location A) 830, thereby causing forced state transition.

Upon transitioning into the idle state, the MSS (location A) 830 no longer possesses the CIDs and IP address, which was possessed by the MSS (location A) 830 in the sleep state, thereby improving the efficiency in use of the radio resources.

Referring to FIG. 8, all of the BSs are constantly broadcasting PZIDs of paging zones to which the BSs belong. The MSS (location A) 830 in the idle state is located in the paging zone having a PZID of 1 (PZID=1). When the MSS (location A) 830 moves from the BS C 803 to the BS B 801, the MSS (location A) 830 does not perform the handover process because the PZID broadcasted by the BS B 801 is the same as that of the BS C 803. That is, when the MSS (location A) 830 moves between BSs having the same PZID, the MSS (location A) 830 need not perform the handover process, thereby reducing the power consumption.

However, when the MSS (location A) 830 moves to the position B, the MSS (location A) 830 receives pilot channel signals of reduced intensities (i.e., reduced CINRs) from the BS C 803. Therefore, the MSS (location A) 830 scans neighboring BSs and performs handover to the BS F 852, which transmits pilot channel signals having the largest CINRs. The MSS (location C) 832 handed over to the BS F 852 transmits a Location Update Request (LU-REQ) message to a paging zone controller (e.g., a BS controller) because the PZID of the BS C 803 (i.e., the previous BS) and the PZID of the BS F 852 are different from each other. Here, the LU-REQ message is transmitted using a contention-based access scheme. Additionally, the LU-REQ message will be described later in more detail, so a detailed description thereof is omitted here.

Upon receiving the LU-REQ message, the paging zone controller updates the location of the MSS (location C) 832.

Thereafter, when the BS F 852 has data to transmit to the MSS (location C) 832 in the idle state, the BS F 852 must make the MSS (location C) 832 state-transition from the idle state to the awake state. The BS F 852 broadcasts a paging message, thereby informing the MSS (location C) 832 of existence of data to be broadcasted. Here, the broadcasting of the paging message is performed for each paging zone. Therefore, all of the BS E 851, the BS F 852, the BS G 853, and the BS H 854 broadcast the paging message. The MSS (location C) 832 having received the paging message performs a network entry process, thereby state-transitioning into the awake state.

Figure 9:
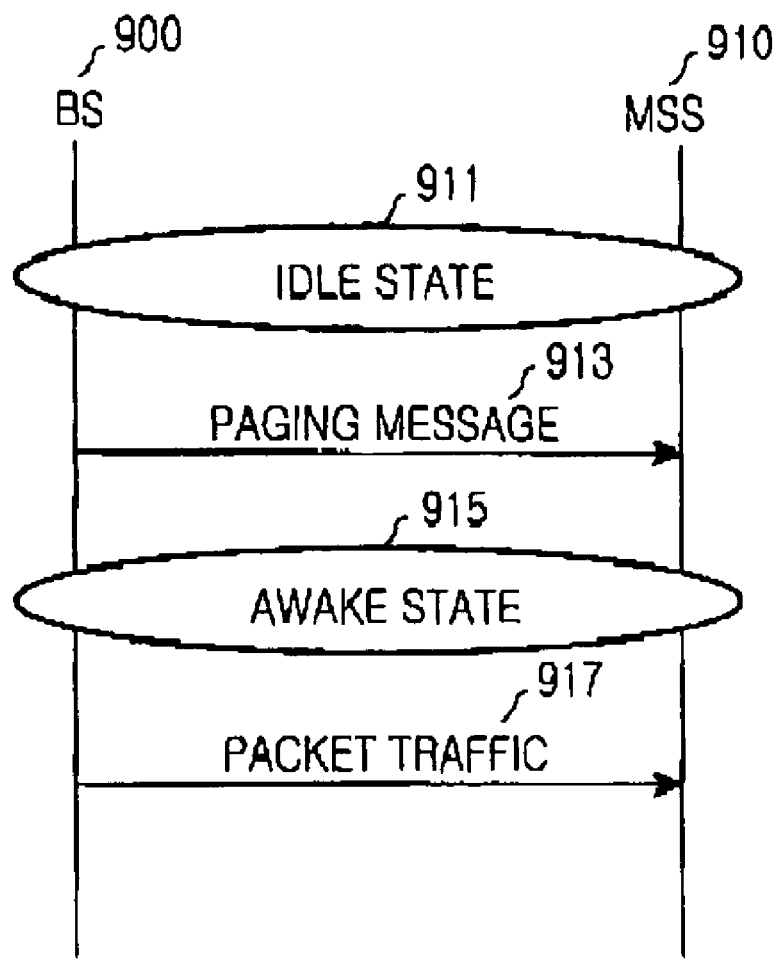
FIG. 9 is a signal flowchart schematically illustrating a process of packet data transmission between a BS and an MSS in the idle state according to an embodiment of the present invention.

FIG. 9 is a signal flowchart schematically illustrating a process of packet data transmission between a BS and an MSS in the idle state according to an embodiment of the present invention. Referring to FIG. 9, an MSS 910 stays in the idle state in step 911. When a packet data to be transmitted from a BS to the MSS 910 is generated, the BS 900 broadcasts a paging message including a specific identifier (i.e., a MAC address) of the MSS 910 in step 913. Then, the BS 900 awakes from the idle state, receives the paging message, and state-transits from the idle state to the awake state in step 915 because the received paging message includes the MAC address of the MSS 910 itself. Thereafter, the MSS 910 receives the packet data from the BS 900.

The embodiment illustrated in FIG. 9 corresponds to a case in which the BS itself first transmits the packet data to the MSS in the idle state. However, when the MSS in the idle state first transmits the packet data to the BS, the MSS state-transits from the idle state to the awake state, performs the network entry process with the BS, and then transmits the packet data to the BS.

Figure 10:
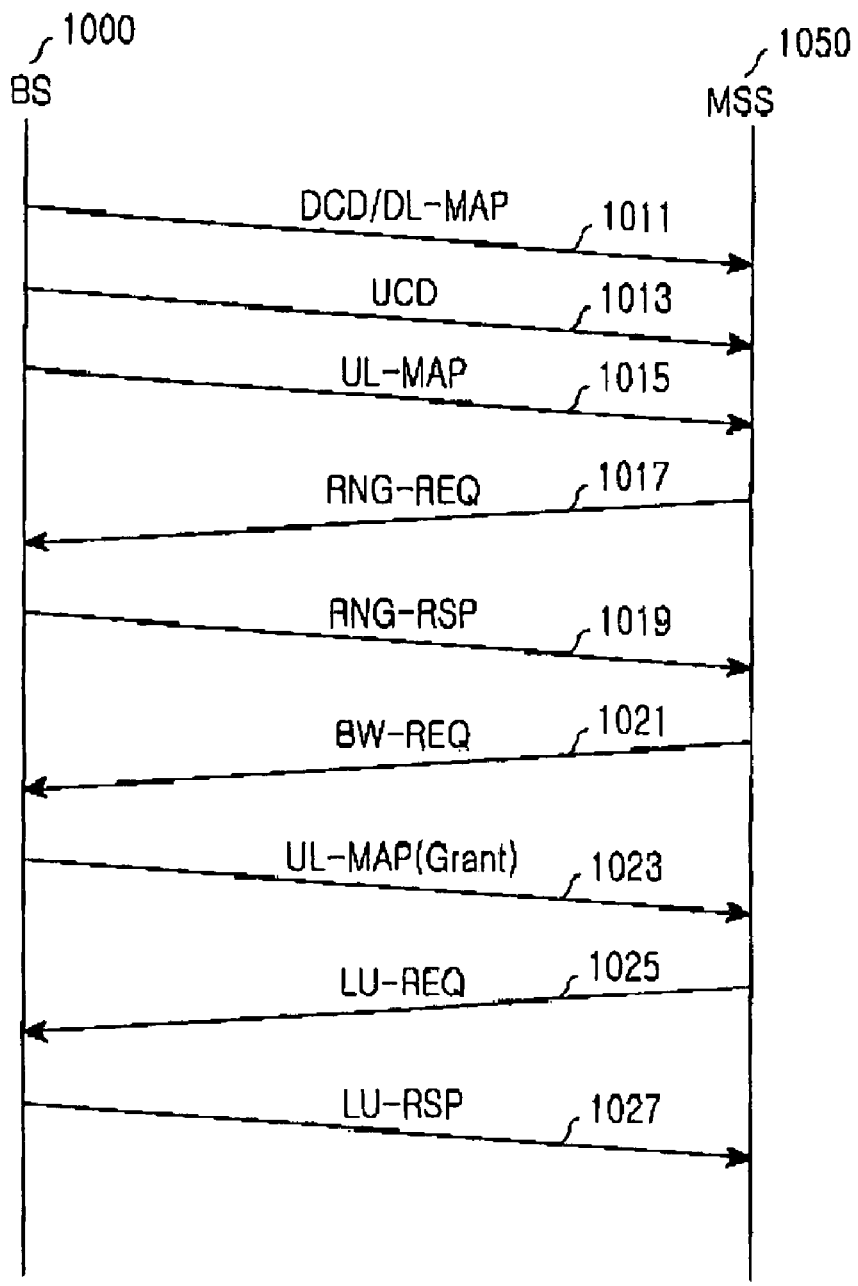
FIG. 10 is a signal flowchart illustrating a process of signal transmission between an MSS and a BS when location registration is performed according to an embodiment of the present invention.

FIG. 10 is a signal flowchart illustrating a process of signal transmission between an MSS and a BS when location registration is performed according to an embodiment of the present invention. Referring to FIG. 10, a BS 1000 having acquired a sync with an MSS 1050 transmits a Downlink Channel Descriptor (DCD) message and a DL-MAP message in step 1011. The BS 1000 receives the DCD message and the DL-MAP message and transmits an Uplink Channel Descriptor (UCD) message to the MSS 1050 in step 1013.

After transmitting the UCD message, the BS 1000 transmits a UL-MAP message to the MSS 1050 in step 1015. The MSS 1050 having received the UL-MAP message from the BS 1000 can recognize ranging codes used in initial ranging from the UCD message, modulation scheme and coding scheme information, and ranging channels and ranging slots from the UL-MAP message. The MSS 1050 randomly selects one ranging code from among the ranging codes used in the initial ranging, randomly selects one ranging slot from among the ranging slots used in the initial ranging, and transmits the selected ranging code through the selected ranging slot to the BS 1000 in step 1017.

When the BS 1000 receives a particular ranging code through a particular ranging slot from the MSS 1050, the BS 1000 transmits a Ranging Response (RNG-RSP) message containing information reporting success in reception of the ranging code (e.g., an OFDMA symbol number, a sub-channel, a ranging code, etc.) to the MSS 1050 in step 1019. Here, although not shown, the MSS 1050 having received the RNG-RSP message adjusts time and frequency offset based on the ranging success information, thereby adjusting the transmission power.

Thereafter, the MSS 1050 transmits a Bandwidth Request (BW-REQ) message in step 1021. The BS 1000 receives the BW-REQ message from the MSS 1050 and transmits UL-MAP message including uplink information for the MSS 1050 to the MSS 1050 in step 1023. The MSS 1050 transmits the LU-REQ message to the BS 1000 by using the uplink information contained in the UL-MAP message in step 1025. Table 7 shows the format of the LU-REQ message.

TABLE 7

| Syntax | Size |
| --- | --- |
| LU-REQ_Message Format ( ) { | |
|     Management Message Type | 8 bits |
|         MAC Address or new numbering-value | ? |
| } | |

In Table 7, the 'Management message Type' represents the type of the message being currently transmitted. The 'MAC Address' represents a MAC address of the MSS 1050 transmitting the LU-REQ message. Herein, the LU-REQ message may be newly generated or generated by modifying an existing message used in the IEEE 802.16e communication system.

The BS 1000 having received the LU-REQ message can understand location change of the MSS 1050 and transmits it to a location control node controlling the location of the MSS 1050 (e.g., a BS controller), thereby enabling the network to understood the location of the MSS 1050. The BS 1000 transmits a Location Update Response (LU-RSP) message to the MSS 1050 in response to the LU-REQ message in step 1027.

Table 8 shows the format of the LU-RSP message.

TABLE 8

| Syntax | Size |
| --- | --- |
| LU-RSP_Message Format ( ) { | |
|     Management Message Type | 8 bits |
|         MAC Address or new numbering-value | ? |
|     Sleep Window | 8 bits |
|     Start Frame | 8 bits |
| } | |

In Table 8, the 'Management message Type' represents the type of the message being currently transmitted. The 'MAC Address' represents a MAC address of the MSS 1050 receiving the LU-RSP message. The 'Sleep Window' indicates a sleep interval used by the MSS 1050 in the idle state and the 'Start Frame' indicates a time point at which the MSS 1050 must start to state-transit into the idle state.

As described above, the present invention provides new MAC layer operation states for a broadband wireless access communication system, thereby minimizing power consumption while supporting the mobility of an MSS and high-speed data transmission. Further, the present invention prevents unnecessary possession of radio resources by discarding the network entry process in the same paging zone. Therefore, the present invention maximizes the efficiency in use of resources and eliminates message overhead due to the network entry.

While the present invention has been shown and described with reference to certain preferred embodiments thereof, it will be understood by those skilled in the art that various changes in form and detail may be made therein without departing from the spirit and scope of the present invention as defined by the appended claims.

What is claimed is:

1. A method for controlling operation states of a medium access control (MAC) layer by a mobile subscriber station (MSS) in a broadband wireless access communication system, the method comprising the steps of:
    requesting de-registration of the MSS to a base station (BS) by the MSS when there is no data transmission between the BS and the MSS during a predetermined first time interval in an awake state;
    canceling registration of the MSS in accordance with the de-registration request;
    transmitting a response to the de-registration request to the MSS by the BS; and
    state-transiting from the awake state to an idle state by the MSS in accordance with the response from the BS.

2. The method as claimed in claim 1, wherein the step of requesting de-registration of the MSS comprises transmitting a de-registration request to the BS, the de-registration request including a sleep interval during which the MSS wants to stay in the idle state.

3. The method as claimed in claim 2, wherein the BS transmits the response to the de-registration request in a sleep interval during which the MSS must stay in the idle state.

4. The method as claimed in claim 1, further comprising the steps of:
    transmitting a location change request to a paging zone controller by the MSS when the MSS in the idle state moves from a first paging zone, to which the MSS currently belongs, to a second paging zone;
    changing a location of the MSS into a location within the second paging zone in accordance with the location change request;
    transmitting a response to the location change request to the MSS by the paging zone controller; and
    state-transiting from the idle state to the awake state by the MSS when the MSS detects a paging signal to the MSS.

5. The method as claimed in claim 4, wherein the MSS detects the existence of the paging signal by receiving paging information broadcasted from the BS to which the MSS currently belongs and recognizes existence of the paging signal when the paging information contains a MSS identifier of the MSS.

6. The method as claimed in claim 5, wherein the MSS identifier is a MAC address of the MSS.

7. The method as claimed in claim 4, wherein each of the first paging zone and the second paging zone includes a plurality of BSs using a same paging zone identifier to provide services.

8. The method as claimed in claim 7, wherein, in the step of requesting location change, the MSS transmits information including a MSS identifier of the MSS to a paging zone controller, in order to request the paging zone controller to change a location of the MSS into a location of a new BS to which the MSS currently belongs within the second paging zone, the paging zone controller controlling the first paging zone and the second paging zone.

9. The method as claimed in claim 8, wherein the MSS identifier is a MAC address of the MSS.

10. The method as claimed in claim 7, wherein the response to the location change request includes a MSS identifier of the MSS, a time point at which the MSS must start to sleep in the idle state, and information on the sleep interval.

11. The method as claimed in claim 10, wherein the MSS identifier is a MAC address of the MSS.

12. A system for controlling operation states of a medium access control (MAC) layer in a broadband wireless access communication system, the system comprising:
    a base station (BS);
    a mobile subscriber station (MSS) for transmitting de-registration request to the BS when there is no data transmission between the BS and the MSS during a predetermined first time interval in an awake state, state-transiting from the awake state to an idle state when receiving a response to the de-registration request from the BS, transmitting a location change request when the MSS in the idle state moves from a first paging zone, to which the MSS currently belongs, to a second paging zone, receiving a location change response to the location change request, and state-transitioning from the idle state to the awake state when detecting a paging signal to the MSS; and
    a paging zone controller for receiving the location change request from the MSS, changing a location of the MSS into a location within the second paging zone in accordance with the location change request, and transmitting the response to the location change request to MSS.

13. The system as claimed in claim 12, wherein the de-registration request transmitted from the MSS to the BS comprises a sleep interval during which the MSS wants to stay in the idle state.

14. The system as claimed in claim 13, wherein the response transmitted from the MSS to the BS in response to the de-registration request comprises a sleep interval during which the MSS must stay in the idle state.

15. The system as claimed in claim 12, wherein each of the first paging zone and the second paging zone comprises a plurality of BS using a same paging zone identifier to provide services.

16. The system as claimed in claim 15, wherein, when MSS transmits the location change request, the MSS transmits information including a MSS identifier of the MSS to the paging zone controller, in order to request the paging zone controller to change the location of the MSS into a location of a new BS to which the MSS currently belongs within the second paging zone, the paging zone controller controlling the first paging zone and the second paging zone.

17. The system as claimed in claim 16, wherein the MSS identifier is a MAC address of the MSS.

18. The system as claimed in claim 15, wherein the response transmitted by the paging zone controller in response to the location change request comprises a MSS identifier of the MSS, a time point at which the MSS must start to sleep in the idle state, and information on the sleep interval.

19. The system as claimed in claim 18, wherein the MSS identifier is a MAC address of the MSS.

20. The system as claimed in claim 12, wherein the MSS receives paging information broadcasted from the BS to which the MSS currently belongs and recognizes the paging signal when paging information includes a MSS identifier of the MSS.

21. The system as claimed in claim 20, wherein the MSS identifier is a MAC address of the MSS.

* * * * *